United States Patent [19]

Ryan

[11] Patent Number: 4,546,047
[45] Date of Patent: Oct. 8, 1985

[54] COMPOSITE TAPE PREFORM FOR ABRADABLE SEALS

[75] Inventor: Edward J. Ryan, Wallingford, Conn.

[73] Assignee: United Technologies Corporation, Hartford, Conn.

[21] Appl. No.: 490,949

[22] Filed: May 2, 1983

Related U.S. Application Data

[62] Division of Ser. No. 225,074, Jan. 14, 1981, Pat. No. 4,409,054.

[51] Int. Cl.⁴ .............................. B22F 3/00; B22F 7/00
[52] U.S. Cl. .................................... 428/565; 419/40; 428/550; 415/174; 75/231; 420/445
[58] Field of Search .................. 428/565, 550, 547; 415/174; 420/443, 445; 75/231, 233, 234, 244, 246; 419/3, 6, 7, 40 S

[56] References Cited

U.S. PATENT DOCUMENTS

| 3,084,064 | 4/1963 | Cowden et al. | 428/565 |
| 3,293,072 | 6/1961 | Doolittle et al. | 428/430 |
| 3,817,719 | 6/1974 | Schilke et al. | 75/231 |
| 3,879,831 | 4/1975 | Rigney et al. | 428/230 |
| 3,975,165 | 8/1976 | Elbert et al. | 419/8 |
| 4,003,716 | 1/1977 | Steigelman et al. | 428/556 |
| 4,094,673 | 6/1978 | Erickson et al. | 428/566 |
| 4,243,169 | 1/1981 | Sara | 419/8 |
| 4,409,054 | 10/1983 | Ryan | 156/293 |

Primary Examiner—Edward A. Miller
Assistant Examiner—Anne Brookes
Attorney, Agent, or Firm—Charles E. Sohl

[57] ABSTRACT

Honeycomb structures, such as those used in turbine engine abradable seals, are provided with a uniform density filling of a suitable abradable material. The abradable material is prepared as a tape preform using an organic binder. The preform is forced into the honeycomb using a rubber tool.

2 Claims, 4 Drawing Figures

COMPOSITE TAPE PREFORM FOR ABRADABLE SEALS

This is a division of application Ser. No. 225,074 filed on Jan. 14, 1981 now U.S. Pat. No. 4,409,054.

TECHNICAL FIELD

This invention relates to a method for applying abradable material to the cells of a honeycomb structure and to the resulting filled honeycomb.

BACKGROUND ART

It is known in the art to use an abradable material in a rotating machinery application to form a good seal between a moving and a stationary part. This result is obtained by permitting one part to cut a channel or groove into the abradable material. In a gas turbine engine the abradable material is usually placed on the stationary case and the rotating blades cut a groove into the abradable material. In this fashion the changes that may result from thermal growth and blade creep are accommodated. Abradable materials are often located and restrained by being placed in a supporting honeycomb structure.

A typical patent which discloses an abradable material is U.S. Pat. No. 3,879,831. The contents of this patent are incorporated by reference. This patent discloses an abradable material having a total composition (by weight) of 60-80% Nickel, 2-12% chromium, 1-10% cobalt, 4-20% aluminum and 3-15% inert material such as diatomaceous earth, boron nitride, silica glass, mica, vermiculite asbestos, molybdenum disulfide, graphite, cobalt oxide, cerium oxide and zinc oxide. Up to 3% of a metal selected from the group consisting of yttrium, hafnium and lanthanum may also be added. Table 1 in the patent lists the abradable material components and the preferred particle sizes. Coated diatomaceous earth which is referred to is a product of the Sherrit-Gordon Corporation consisting of diatomaceous earth which has been coated with nickel or an alloy of nickel and chromium.

Similar teachings are found in U.S. Pat. No. 3,817,719 which is also incorporated herein by reference. Such known abradable materials have been applied to honeycomb structures by mixing the dry constituents with a liquid binder such as cellulose nitrate to form a paste and then packing the material into the honeycomb cells. With this method of applying the material to the honeycomb structure various difficulties have been encountered. The uniformity of application is quite variable; consequently, when a complete filling of the cells is desired, it may not be consistently achieved. The results depend to a large extent on the skill of the operator. Further, for those applications which require a partial fill of the honeycomb cells, so that only the bottom half of the cells contain the abradable material, this technique is not capable of producing the desired results.

DISCLOSURE OF INVENTION

An object of this invention is to provide a pliable tape preform consisting of at least one region which contains an substantial amount of a braze material and a second region which is composed primarily of an abradable material. Another object of this invention is to disclose application techniques for using this preform to produce honeycomb structure which is either partially or completely filled with abradable material. Yet another object of this invention is to provide a honeycomb structure which is only partially filled with abradable materials. Other features and advantages will be apparent from the specification and claims and from the accompanying drawings which illustrate an embodiment of the invention.

BEST MODE FOR CARRYING OUT THE INVENTION

The present invention relates to honeycomb structures which are at least partially filled with an abradable tape and to methods for producing such structures. The honeycomb structure consists of a multiplicity of hexagonal cells which are separated from each other by thin metal cell walls. Each cell is open at one end while the other end abuts a substrate. "Partially filled honeycomb cells", denote a structure having an abradable composition which extends from the substrate upwards in the cell in a uniform fashion but which does not extend to the top of the cell.

Abradable materials are a class of materials characterized by a high degree of porosity, oxidation resistance, low thermal conductivity and the ability to be cleanly abraded away in a localized area. Typical of such materials are those described in U.S. Pat. Nos. 3,879,831 and 3,817,719. The exact abradable material used is a matter of choice and depends on the particular applications.

Braze materials are a class of relatively low melting point materials often based on nickel or gold with additions of various melting point depressants. The particular braze material used will depend in part on the abradable material and the substrate composition.

The present invention employs a pliable composite tape preform consisting of a thin layer which contains a substantial quantity of a metallic braze material and a thinner layer comprised of the abradable material. The composition tape may be produced using the teachings of U.S. Pat. No. 3,293,072 which is incorporated herein by reference. This patent shows how a tape preform may be produced using a removable carrier film as a substrate and employing an organic polymer such as polyvinyl alcohol or polymethacrylates along with a smaller amount of a volatile plasticizer such as sucrose-acetate isobutyrate, dibutylphthalate or diethyl-oxalate, for use with the polymethacrylate binders, and glycerine for use with the polyvinyl alcohol binders. The powder material is formed into a slurry with the binder, plasticizer and acetone, as solvent, applied as a thin layer to the removable substrate and then heated to remove the solvent.

Figure 1:
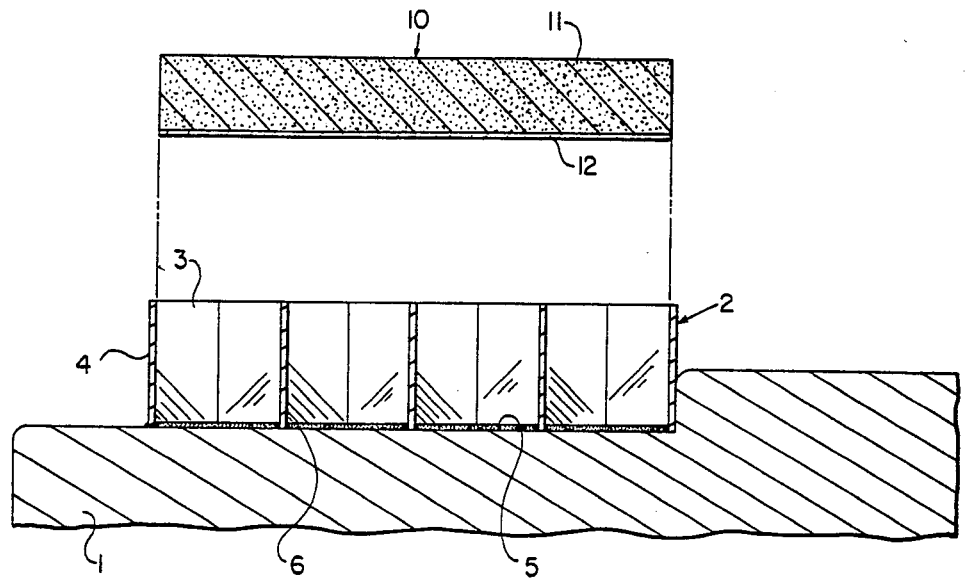
FIG. 1 shows a cross section of an abradable tape and a honeycomb structure prior to insertion of the abradable tape.

The present invention will be better understood through reference to the illustrative figures which accompany the specification. FIG. 1 is a cross-sectional view of the honeycomb structure and the tape configured abradable material prior to insertion of the abradable material into the honeycomb. In the figure the honeycomb structure is supported on a substrate 1 and is typically attached thereto by brazing. The honeycomb structure 2 consists of a continuation of hexagonal cells 3 which are defined by thin metal walls 4. The cells 3 are opened at the top and closed at the bottom by the substrate surface 5. The honeycomb structure 2 is joined to the substrate 1 by brazing at the junction between the cell walls 4 and the substrate surface 5. This braze junction appears in FIG. 1 but is deleted in subsequent figures for clarity. Above this substrate cell structure is shown a tape 10 which consists of the abradable portion 11 and the braze portion 12. As previously indicated, this tape is somewhat flexible and pliable as a consequence of the retained binder and plasticizer which will be removed subsequent to installation of the tape-abradable in the honeycomb structure.

Figure 2:
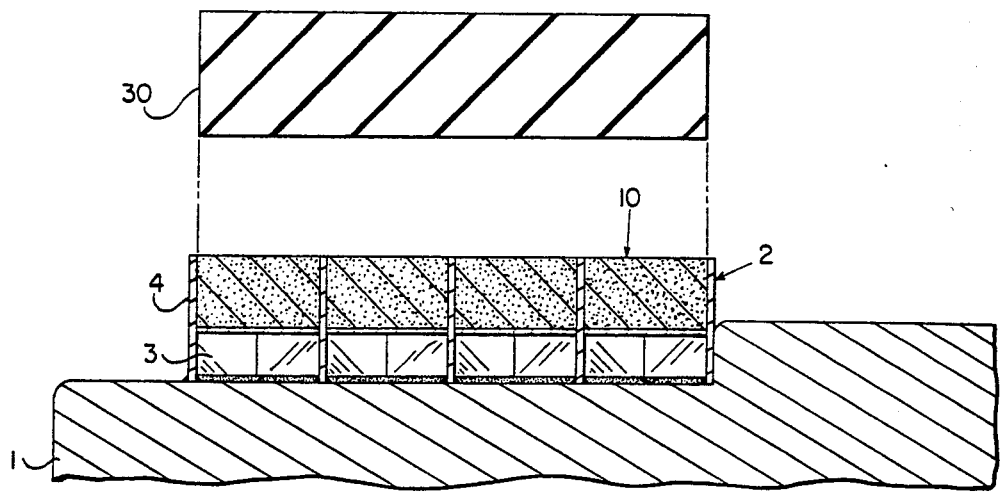
FIG. 2 shows a honeycomb structure after the abradable tape has been partially inserted.
Figure 3:
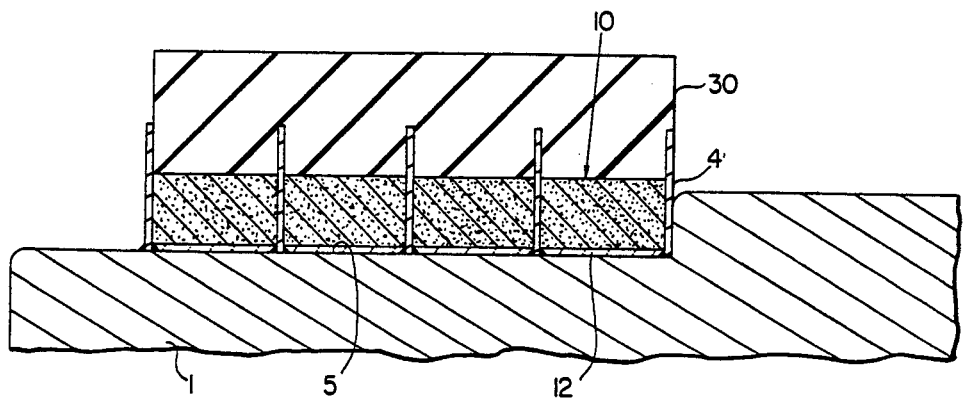
FIG. 3 shows a honeycomb structure after complete insertion of an abradable tape forming a partially filled honeycomb structure.

FIG. 2 shows the same components as shown in FIG. 1 after the tape-abradable material has been partially inserted into the honeycomb structure. Also shown in FIG. 2 is a rubber strip 30 whose purpose is to insert and locate the composite abradable tape into the honeycomb structure. In FIG. 2 the composite tape 10 has been forced into the honeycomb cell structure 2 and the cell walls 4 of the honeycomb structure have cut the abradable composite tape cutting the tape into hexagonal pieces which closely conform to the honeycomb cells. Insertion of the composite abradable tape into the honeycomb cell structure can be accomplished by using a flat plate or roller to force the material down into the individual honeycomb cells. The insertion tool used, whether a plate or roller should preferably have some resilience so as to ensure complete insertion of the tape into the cell structure and to minimize the possibility of damaging the individual cell walls 4 by the application of excessive force. The rubber strip 30 is used to completely insert the composite tape abradable material into the honeycomb cells and to ensure that the abradable material is firmly seated at the bottom of the individual cell segments. This is shown in FIG. 3. During the insertion process the rubber strip 30 is itself cut by the cell walls 4 as was the abradable tape during its initial insertion. An isostatic force is applied to the abradable material by the rubber strip 30 which ensures that the abradable material is firmly seated at the bottom of the cell structure so that the braze layer 12 at the bottom of the abradable tape 10 makes good contact with the surface 5 of the substrate 1. This good contact is necessary to ensure that a good braze joint is formed upon subsequent heating. Following the complete insertion of the composite abradable tape into the cell structure using the rubber strip, the strip 30 is then removed leaving the composite abradable material in the cell structure. If the rubber strip is not completely removed it will be decomposed during the heating which is performed to remove the binder and plasticizer and the heating which is necessary to form the braze joint between the braze layer 12 and the substrate surface 5.

Certain properties are necessary if the rubber material which is used to form the strip 30 is to properly perform its task of forcing the composite abradable tape down into the honeycomb cells. The material must be pliable and compressible to a limited extent so that it can conform to any irregularities of composite tape thickness which may occur. Most importantly the rubber material must have a relatively low shear strength so that the honeycomb cell walls will easily and accurately cut their way into the rubber material. Adequate results have been obtained with a blend of approximately 50% glass micro-spheres and room temperature vulcanizing rubber (RTV) appropriately cured.

The following description of a specific process is intended to illustrate the invention but is not intended to limit the invention. It was desired to fill a honeycomb structure having the cells of ⅛ inch in size which were about ⅛ inch deep. The intended filler material was that material described in U.S. Pat. No. 3,879,831. A composition consisting of 30% by weight of the nickel chromium alloy (80% nickel–20% chromium) having a particle size of minus 230 mesh and 15% by weight of a cobalt-aluminum-yttrium alloy (30% cobalt, 69% aluminum, 1% yttrium) having a particle size of minus 325 mesh and 55% by weight of nickel coated diatomaceous earth (85% nickel, 15% diatomaceous earth) was mixed and throughly blended in the dry state. This mixture represents the components which were to form the abradable material. A braze composition known as AMS 4778 (92% nickel, 3% boron, 4.5% silicon) was provided for use in bonding the abradable material to the substrate. The braze material was provided as a powder of minus 325 mesh size. Two tapes were formed according to the process described in U.S. Pat. No. 3,293,072. One tape was comprised of 75% by weight of the previously described abradable mixture and 25% by weight of the braze material. The thickness of this tape was less than 10 mils. The second tape was comprised completely of the abradable material and had a thickness of 40 mils. These two tapes were pressed together while they were still in a sticky condition and adhered to each other as a consequence of the liquid binder which was present in each tape. This abradable tape was placed over a honeycomb structure with the braze rich layer facing the honeycomb structure and was pressed into the honeycomb structure using a roller. A strip of the previously described rubber material was then placed over the partially filled honeycomb and the roller was then used to force this rubber material into the cells and consequently force the abradable tape material down to the bottom of the honeycomb cells. The rubber strip was removed and the partially filled honeycomb material was then baked at a temperature of about 1200° F. for a period of about 30 minutes to decompose and evaporate or sublimate the binder and plasticizer and was then heated at a higher temperature of about 1850° and 1950° F. for about 5 hours to melt the braze material and cause the braze material to bond to the substrate surface.

Figure 4:
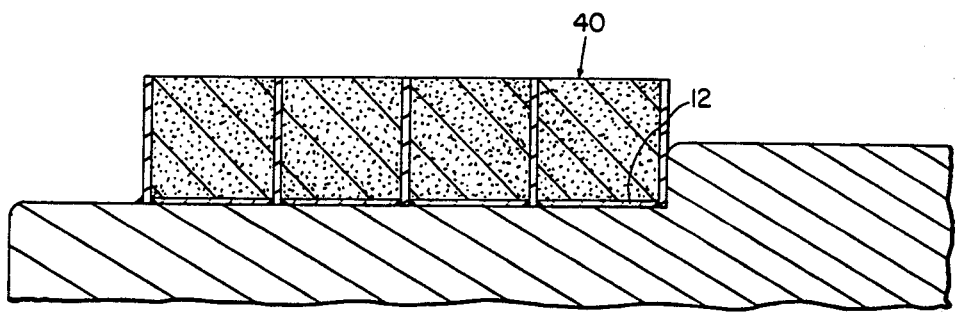
FIG. 4 shows a honeycomb structure after complete insertion of an abradable tape forming a completely filled honeycomb structure.

FIG. 4 shows another embodiment of the invention in which a tape of the same composition as previously described is used to completely fill a honeycomb structure. In this situation the tape has a thickness which is substantially equal to the height of the honeycomb cell structure and the tape is forced into the honeycomb cell structure using the previously described roller or flat pressing plate. In this situation the tape structure is used to ensure a uniform density of abradable material in each cell structure and to assure that each cell structure has a thin uniform layer of braze material at the bottom of the cell.

It should be understood that the invention is not limited to the particular embodiments shown and described herein, but that various changes and modifications may be made without departing from the spirit and scope of this novel concept as defined by the following claims.

I claim:

1. A composite abradable preform consisting of a layer of powered material containing a substantial amount of braze alloy, a second layer joined to the first layer comprising a powdered abradable composition consisting by weight of 60-80% nickel, 2-12% chromium, 1-10% cobalt, 4-20% aluminum, 3-15% of an inert material selected from the group consisting of diatomaceous earth, boron nitride, silica glass, mica, vermiculite, asbestos, molybdenum disulfide, graphite, cobalt oxide, cerium oxide, zinc oxide, and mixtures thereof, and up to 3% of a material selected from the group consisting of yttrium, hafnium, lanthanum, and mixtures thereof, both of said layers also containing a binder and a plasticizer and being flexible and compliant.

2. A preform as in claim 1 in which the binder is selected from the group consisting of polyvinyl alcohols and polyvinyl methacrylates.

* * * * *